(12) United States Patent
Li et al.

(10) Patent No.: US 10,438,093 B2
(45) Date of Patent: Oct. 8, 2019

(54) SOFTWARE DEVELOPMENT TEST PLATFORM AND ASSOCIATED METHOD FOR EVALUATING VISUAL OUTPUT GENERATED BY EXECUTION OF COMPUTER SOFTWARE

(71) Applicant: HERE GLOBAL B.V., Eindhoven (NL)

(72) Inventors: Ambrose Li, Burnaby (CA); Qiong Wu, Vancouver (CA)

(73) Assignee: HERE Global B.V., Eindhoven (NL)

( * ) Notice: Subject to any disclaimer, the term of this patent is extended or adjusted under 35 U.S.C. 154(b) by 78 days.

(21) Appl. No.: 15/672,995

(22) Filed: Aug. 9, 2017

(65) Prior Publication Data

US 2019/0050677 A1 Feb. 14, 2019

(51) Int. Cl.
G06K 9/00 (2006.01)
G06K 9/62 (2006.01)
G06F 11/36 (2006.01)

(52) U.S. Cl.
CPC ........ *G06K 9/6212* (2013.01); *G06F 11/3636* (2013.01); *G06F 11/3672* (2013.01); *G06F 11/3692* (2013.01); *G06F 11/3664* (2013.01)

(58) Field of Classification Search
CPC ............. G06F 11/3688; G06F 11/3636; G06F 11/3672; G06F 11/3664; G06F 17/30247;
(Continued)

(56) References Cited

U.S. PATENT DOCUMENTS 9,298,598 B2 3/2016 Frye et al.
9,324,014 B1 * 4/2016 Dixon .................. G06F 3/1238
(Continued)

FOREIGN PATENT DOCUMENTS

EP 2743832 6/2014

OTHER PUBLICATIONS

C. Y. Lin and S. F. Chang, "A robust image authentication system distinguishing JPEG compression from malicious manipulation." IEEE Transactions on Circuits System and Video Technology. (2001), 11(2), 153-168 (Year: 2001).*
(Continued)

*Primary Examiner* — Bhavesh M Mehta
*Assistant Examiner* — Ian L Lemieux
(74) *Attorney, Agent, or Firm* — Alston & Bird LLP

(57) ABSTRACT

A software development test platform, method and computer program product are provided to evaluate, on a perceived information level, visual output generated by execution of computer software. In the context of a method, data is provided that is representative of the visual output generated in response to execution of computer software. The method also includes comparing the data representative of the visual output to a reference image utilizing perceptual hashing. The comparison of the data representative of the visual output to the reference image includes comparing a hash value of the data representative of the visual output and a hash value of the reference image to define a perceptual difference between the visual output and the reference image. The method further includes determining the visual output to be acceptable in an instance in which the perceptual difference satisfies a predefined threshold.

17 Claims, 3 Drawing Sheets

(58) Field of Classification Search
CPC .............. G06F 21/10; G06F 2221/0737; G06F 3/04845; G06F 3/1238; G06F 3/1242; G06F 3/1243; G06F 3/1288; G06F 8/65; G06F 9/451; G06F 9/0063; G06F 9/00637; G06Q 30/0205; G06T 11/60; G06T 1/0042; G06T 1/005; G06T 2201/0051; G06T 2201/0053; G06T 2201/0061; G06T 2201/0065; G06T 2201/0083; G06K 9/6212; G06K 9/0063

See application file for complete search history.

(56) References Cited

U.S. PATENT DOCUMENTS

| | | | |
|---|---|---|---|
| 9,547,866 | B2 | 1/2017 | Terrazas et al. |
| 9,626,596 | B1* | 4/2017 | Suman .................. G06K 9/6215 |
| 2010/0185615 | A1* | 7/2010 | Monga .............. G06F 17/30247 707/736 |
| 2011/0276946 | A1* | 11/2011 | Pletter ................. G06F 11/3688 717/124 |
| 2015/0086115 | A1 | 3/2015 | Danko |

OTHER PUBLICATIONS

"Applitools—FAQs." [retrieved Sep. 11, 2017]. Retrieved from the Internet: <URL: http://staging.applitools.com/faq/>. (dated 2015), 4 pages.

"pHash.org: Home of pHash, the open source perceptual hash library." [retrieved Sep. 13, 2017]. Retrieved from the Internet: <URL: http://www.phash.org/>. (dated 2010) 4 pages.

"Velocity 2013: The Secret of Safe Continuous Deployment: Perceptual Diffs." [retrieved Sep. 11, 2017]. Retrieved from the Internet: <URL: https://www.youtube.com/watch?v=1wHr-O6gEfc>, (dated Aug. 5, 2013), 4 pages.

Fryč, Lukáš. "Visual Testing of Browser Screen Captures." Bachelor's Thesis, Faculty of Informatics Masaryk University, (2011), 52 pages.

Hamon, Kevin et al. "Histogram-based perceptual hashing for minimally changing video sequences." Automated Production of Cross Media Content for Multi-Channel Distribution, 2006. AXMEDIS'06. Second International Conference on. IEEE, 2006, pp. 236-241.

Jiao, Yuhua et al. "Compressed domain perceptual hashing for MELP coded speech." Intelligent Information Hiding and Multimedia Signal Processing, 2008. IIHMSP'08 International Conference on. IEEE, 2008, pp. 410-413.

Jiao, Yuhua, et al. "MDCT-based perceptual hashing for compressed audio content identification." Multimedia Signal Processing, 2007. MMSP 2007. IEEE 9th Workshop on. IEEE, 2007, pp. 381-384.

Kalker et al. "Issues with digital watermarking and perceptual hashing." Proc. SPIE. vol. 4518. 2001, p. 189.

Koval, Oleksiy J., et al. "Security analysis of robust perceptual hashing." Security, Forensics, Steganography, and Watermarking of Multimedia Contents. 2008, p. 681906.

Kulmukhametov, A. et al. "Automated quality assurance for migration of born-digital images." Archiving Conference, vol. 2014, pp. 73-78.

Malisa, L. et al. "Mobile Application Impersonation Detection Using Dynamic User Interface Extraction." In "Computer Security—ESORICS 2016." Lecture Notes in Computer Science, vol. 9878, (2016), 20 pages.

Niu, Xia-mu et al. "An overview of perceptual hashing." Acta Electronica Sinica 36.7 (2008): pp. 1405-1411.

Tang, et al. "Perceptual Hashing for Color Images Using Invariant Moments." Applied Mathematics & Information Sciences 6, No. 2S, (2012), pp. 643S-650S.

Voloshynovskiy et al. "Robust perceptual hashing as classification problem: decision-theoretic and practical considerations." Multimedia Signal Processing, 2007. MMSP 2007. IEEE 9th Workshop on. IEEE, 2007, pp. 345-348.

Voloshynovskyy, Svyatoslav, et al. "Conception and limits of robust perceptual hashing: toward side inormation assisted hash functions." (2009).

Yang, Bian et al. "Block mean value based image perceptual hashing." Intelligent Information Hiding and Multimedia Signal Processing, 2006. IIH-MSP'06. International Conference on. IEEE, 2006, pp. 167-172.

Yangli Hector Yee et al. "A perceptual metric for production testing." ACM SIGGRAPH 2004 Sketches, Aug. 8-12, 2004, Los Angeles, California, 6 pages.

Zauner, C. "Implementation and Benchmarking of Perceptual Image Hash Functions." Master's thesis, Upper Austria University of Applied Sciences, Hagenberg Campus (2010), 107 pages.

Zhou, Xuebing et al. "Perceptual hashing of video content based on differential block similarity." International Conference on Computational and Infromation Science. Springer Berlin Heidelberg, 2005, pp. 80-85.

International Search Report and Written Opinion for Application No. PCT/IB2018/055982 dated Jan. 3, 2019, 12 pages.

* cited by examiner

SOFTWARE DEVELOPMENT TEST PLATFORM AND ASSOCIATED METHOD FOR EVALUATING VISUAL OUTPUT GENERATED BY EXECUTION OF COMPUTER SOFTWARE

TECHNOLOGICAL FIELD

An example embodiment relates generally to a software development test platform and associated method and computer program product and, more particularly, to a software development test platform and associated method and computer program product for evaluating visual output generated by execution of computer software.

BACKGROUND

During many software development programs, the output generated by execution of the software must be evaluated. This evaluation determines whether the software is executing properly and providing the desired output and identifies those instances in which the software fails to perform properly such that the software may be modified or otherwise rewritten prior to release. The evaluation may be performed by test engineers who compare the output generated by execution of the computer software to a predefined output that is anticipated. However, the evaluation of the results by test engineers may be more costly and may take longer than is desired in some instances.

As such, automated verification techniques have been developed to compare the output generated by execution of computer software to the predefined output. This automated verification process may compare the output generated by execution of the computer software to the predefined output on a bit-by-bit basis. This bit-wise comparison, such as performed by the ImageMagick® software suite, generally evaluates the performance of the computer software appropriately in instances in which the execution of computer software generates non-sensory data. However, in instances in which the output produced by the execution of the computer software is sensory based, such as data that is to be evaluated visually as opposed to simply numerically, automated verification techniques have struggled to consistently and correctly evaluate the visual output and, instead, test engineers have continued to be relied upon to manually evaluate the visual output, thereby generally increasing the costs and the time associated with the verification process.

In this regard, automated verification processes applied to visual output generated by the execution of computer program have compared the image generated by execution of the computer program to a reference image on a bit-by-bit basis. This bit-wise comparison of an image generated by execution of computer software to a reference image may sometimes lead to inaccurate results as there are a number of instances in which the image generated by execution of computer software is perceived by a viewer to be accurate, that is, to be the same as the reference image, even though the bit-wise comparison indicates otherwise. For example, the image generated by execution of the computer software may be presented in such a manner that the image that is displayed varies slightly from display device to display device, even though the output generated by execution of the computer program is identical in each instance. In this situation, automatic verification in the form of a bit-wise comparison may indicate that the image generated by execution of the computer program is inaccurate relative to the reference image, even though the image output by execution of the computer program is perceptually indistinguishable to a viewer relative to the reference image. Similarly, the image generated by the execution of the computer program and presented for display may be color shifted or translated, zoomed or rotated in a visually imperceptible manner relative to the reference image. In this situation, automatic verification in the form of a bit-wise comparison may also indicate that the image generated by execution of the computer program is inaccurate relative to the reference image, even though the image output by execution of the computer program is perceptually indistinguishable to a viewer relative to the reference image. Further, in instances in which the image generated by execution of the computer program results in the display of a map, changes in the map brought about by updates to the map that is utilized as a reference image, such as due to changes in road conditions and traffic updates, may again cause the image generated by execution of the computer program to differ from the reference image when compared with a bit-wise comparison, even though the map generated by execution of the computer program and the reference image are perceptually indistinguishable.

In the foregoing situations, the automatic verification of the sensory-based output generated by execution of a computer program may not be satisfied even though the image output by execution of the computer program and reference image are perceptually indistinguishable to a viewer. Instead, the bit-wise comparison will flag the output for manual review, such as by a test engineer, or will otherwise reject the output as being improper. Test engineers, in turn, must review the output generated by execution of the computer program and, in many instances, will find that the image output by generation of the computer program and reference image are perceptually indistinguishable such that the computer program is considered to be executing in an acceptable manner, even though the bit-wise comparison rejected the output image. Thus, the use of automatic verification of the output generated by execution of the computer software during a computer software development program may still rely upon manual review of the output by test engineers in a larger percentage of instances than is desired, thereby increasing the cost and time required for review of the output generated by execution of the computer program during the development of the computer program.

BRIEF SUMMARY

A software development test platform, method and computer program product are provided in accordance with an example embodiment in order to evaluate visual output generated by execution of computer software. In this regard, the software development test platform, method and computer program product of an example embodiment permit the visual output generated by execution of computer software to be evaluated on a perceived information level, as opposed to a bit-by-bit wise comparison. As such, the software development test platform, method and computer program product of an example embodiment will determine that the visual output generated by execution of computer software is acceptable relative to a reference image in an instance in which the visual output and the reference image are perceptually indistinguishable or in which the perceptual difference therebetween is relatively minor, even though a bit-by-bit comparison would have flagged the visual output for further review by a test engineer. Thus, the software development test platform, method and computer program product of an example embodiment may find the visual output generated by execution of computer software to be acceptable, even in instances in which the visual output varies from the reference image by imperceptible differences, such as due to being output by a different display device, by being shifted, zoomed or rotated by an imperceptible degree, or in response to relatively minor map updates in instances in which the visual output represents a map. Thus, the software development test platform, method and computer program product of an example embodiment may provide for more comprehensive automated verification of the output generated by execution of computer software and may require the assistance of test engineers for further review less frequently so as to increase the speed and decrease the cost associated with verification of the output generated by execution of computer software.

In an example embodiment, a software development test platform is provided that includes at least one processor and at least one memory including computer program code with the at least one memory and computer program code configured to, with the processor, cause the software development test platform to at least provide data representative of the visual output generated in response to execution of the computer software. The at least one memory and the computer program code are also configured to, with the processor, cause the software development test platform to compare the data representative of the visual output to a reference image utilizing perceptual hashing. The data representative of the visual output is compared to the reference image by comparing a hash value of the data representative of the visual output and a hash value of the reference image to define a perceptual difference between the visual output and the reference image. The at least one memory and the computer program code are further configured to, with the processor, cause the software development test platform to determine the visual output to be acceptable in an instance in which the perceptual difference satisfies a predefined threshold.

In an example embodiment in which the data representative of the visual output comprises image data, the at least one memory and the computer program code are configured to, with the processor, cause the software development test platform to compare the data representative of the visual output to the reference image by creating the hash value of the data representative of the visual output by decolorization and separation of the image data into a collection of frequencies and scalers through computation of a discrete cosine transform. In an example embodiment, the at least one memory and the computer program code are configured to, with the processor, cause the software development test platform to compare the data representative of the visual output to the reference image by comparing the data representative of the visual output to the reference image at a perceived information level.

The at least one memory and the computer program code are configured to, with the processor, cause the software development test platform of an example embodiment to compare the hash value of the data representative of the visual output and the hash value of the reference image by determining a distance between the hash value of the data representative of the visual output and the hash value of the reference image to define the perceptual difference between the visual output and the reference image. In an example embodiment, the at least one memory and the computer program code are configured to, with the processor, cause the software development test platform to provide the visual output by providing map-centric rendered data. In this regard, the map-centric rendered data, may include one or more of a rendered map or a calculated route. The at least one memory and the computer program code are further configured to, with the processor, cause the software development test platform of an example embodiment to identify the visual output to be subjected to further review in an instance in which the perceptual difference fails to satisfy the predefined threshold.

In another embodiment, a method is provided for evaluating visual output generated by execution of computer software. The method includes providing the data representative of the visual output generated in response to execution of computer software. The method also includes comparing the data representative of the visual output to a reference image utilizing perceptual hashing. In this regard, the comparison of the data representative of the visual output to the reference image includes comparing a hash value of the data representative of the visual output and a hash value of the reference image to define a perceptual difference between the visual output and the reference image. The method further includes determining the visual output to be acceptable in an instance in which the perceptual difference satisfies a predefined threshold.

In an embodiment in which the data representative of the visual output comprises image data, the method compares the data representative of the visual output to the reference image by creating the hash value of the data representative of the visual output by decolorization and separation of the image data into a collection of frequencies and scalers through computation of a discrete cosine transform. The method of an example embodiment compares the data representative of the visual output to the reference image by comparing the data representative of the visual output to the reference image at a perceived information level. The method of an example embodiment compares the hash value of the data representative of the visual output and the hash value of the reference image by determining a difference between the hash value of the data representative of the visual output and the hash value of the reference image to define the perceptual difference between the visual output and the reference image. The method of an example embodiment provides a visual output by providing map-centric rendered data, such as one or more of a rendered map or a calculated route. The method of an example embodiment also includes identifying the visual output to be subjected to further review in an instance in which the perceptual difference fails to satisfy the predefined threshold.

In a further example embodiment, a computer program product is provided that includes at least one non-transitory computer-readable storage medium having computer-executable program code portions stored therein with the computer-executable program code portions including program code instructions configured to provide the data representative of the visual output generated in response to execution of the computer software. The computer-executable program code portions also include program code instructions configured to compare the data representative of the visual output to a reference image utilizing perceptual hashing. In this regard, the program code instructions configured to compare the data representative of the visual output to the reference image include program code instructions configured to compare a hash value of the data representative of the visual output and a hash value of the reference image to define a perceptual difference between the visual output and the reference image. The computer-executable program code portions further include program code instructions configured to determine the visual output to be acceptable in an instance in which the perceptual difference satisfies a predefined threshold.

In an embodiment in which the data representative of the visual output comprises image data, the program code instructions configured to compare the data representative of the visual output to the reference image further include program code instructions configured to create the hash value of the data representative of the visual output by decolorization and separation of the image data into a collection of frequencies and scalers through computation of a discrete cosine transform. In an example embodiment, the program code instructions configured to compare the data representative of the visual output to the reference image further include program code instructions configured to compare the data representative of the visual output to the reference image at a perceived information level. The program code instructions configured to compare the hash value of the data representative of the visual output and the hash value of the reference image include, in an example embodiment, program code instructions configured to determine the distance between the hash value of the data representative of the visual output and the hash value of the reference image to define the perceptual difference between the visual output and the reference image. The program code instructions configured to provide the data representative of the visual output include, in one embodiment, program code instructions configured to provide map-centric rendered data, such as a rendered map or a calculated route. In an example embodiment, the computer-executable program code portions further include program code instructions configured to identify the visual output to be subjected to further review in an instance in which the perceptual difference fails to satisfy the predefined threshold.

In yet another example embodiment, an apparatus is provided for evaluating visual output generated by execution of computer software. The apparatus of this example embodiment includes means for providing the data representative of the visual output generated in response to execution of computer software. The apparatus also includes means for comparing the data representative of the visual output to a reference image utilizing perceptual hashing. In this regard, the means for comparing the data representative of the visual output to the reference image includes means for comparing a hash value of the data representative of the visual output and a hash value of the reference image to define a perceptual difference between the visual output and the reference image. The apparatus further includes means for determining the visual output to be acceptable in an instance in which the perceptual difference satisfies a predefined threshold.

In an embodiment in which the data representative of the visual output comprises image data, the means for comparing the data representative of the visual output to the reference image also includes means for creating the hash value of the data representative of the visual output by decolorization and separation of the image data into a collection of frequencies and scalers through computation of a discrete cosine transform. In an example embodiment, the means for comparing the data representative of the visual output to the reference image further includes means for comparing the data representative of the visual output to the reference image at a perceived information level. In an example embodiment, the means for comparing the hash value of the data representative of the visual output and the hash value of the reference image includes means for determining a distance between the hash value of the data representative of the visual output and the hash value of the reference image to define a perceptual difference between the visual output and the reference image. In an example embodiment, the means for providing the data representative of the visual output includes means for providing map-centric rendered data, such as a rendered map or a calculated route. In an example embodiment, the apparatus further includes means for identifying the visual output to be subjected to further review in an instance in which the perceptual difference fails to satisfy the predefined threshold.

BRIEF DESCRIPTION OF THE DRAWINGS

Figure 1:
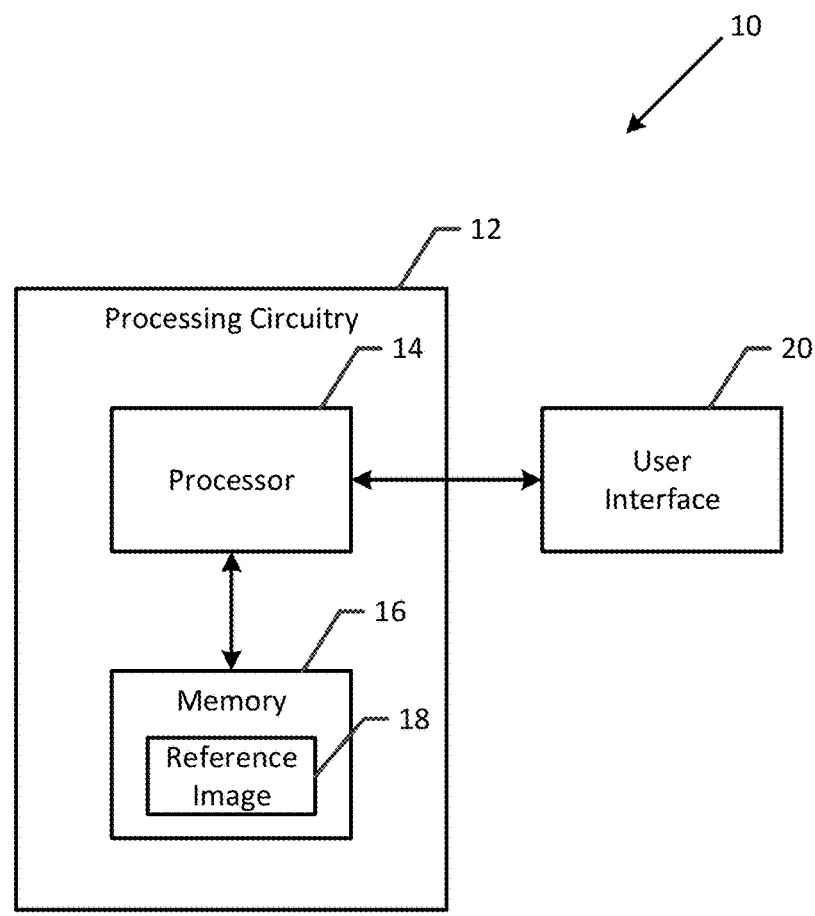
Figure 2:
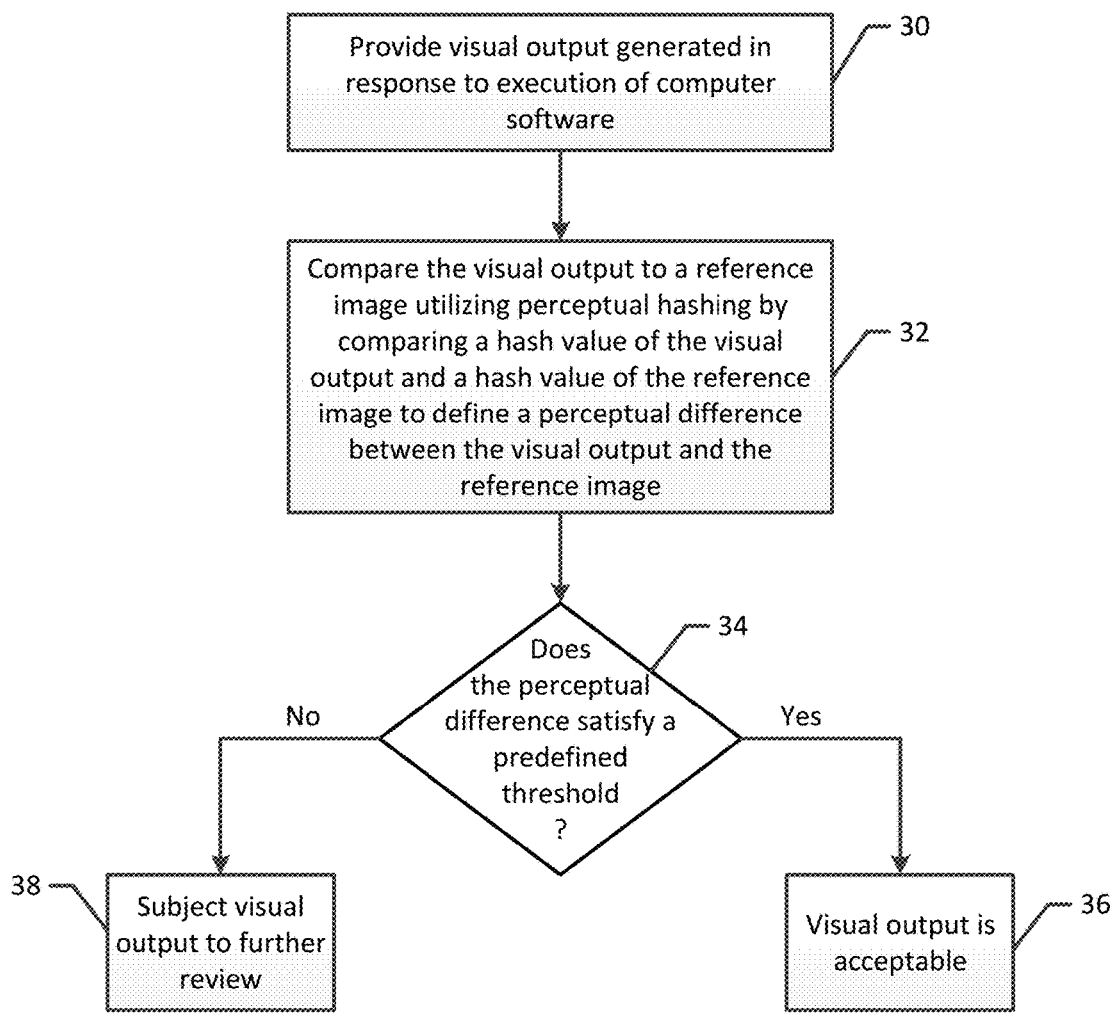
Figure 3:
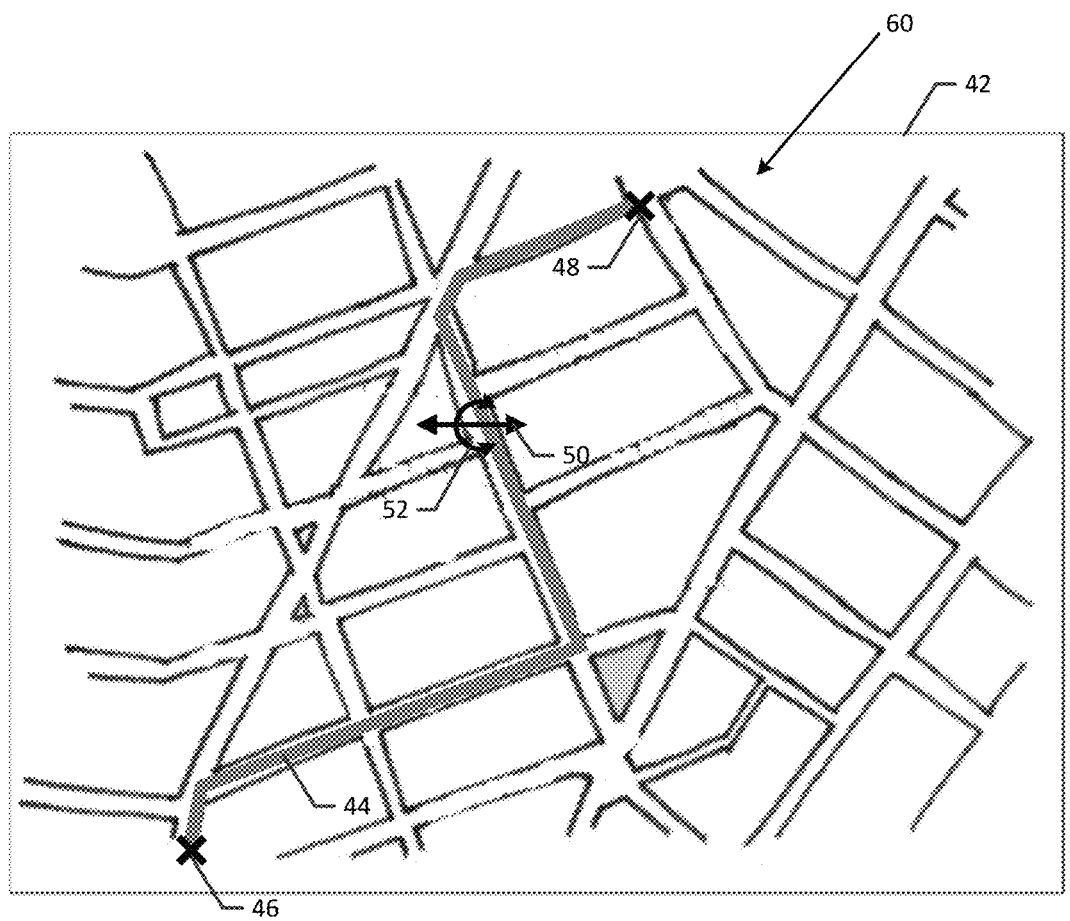

Having thus described certain example embodiments of the present disclosure in general terms, reference will hereinafter be made to the accompanying drawings, which are not necessarily drawn to scale, and wherein:

FIG. 1 is a block diagram of a software development test platform configured in accordance with an example embodiment of the present disclosure;

FIG. 2 is a flowchart illustrating the operations performed, such as by the software development test platform of FIG. 1, in accordance with an example embodiment of the present disclosure; and FIG. 3 is an example of visual output in the form of map-centric rendered data as generated by execution of computer software and as evaluated in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A software development test platform, method and computer program product are provided in accordance with an example embodiment in order to evaluate visual output generated by execution of computer software. As such, the software development test platform, method and computer program product can determine if the computer software, such as computer software that is undergoing development, is executing properly or if the computer software needs to be modified or subjected to a manual review. In this regard, the visual output may be evaluated at a perceived information level as opposed to merely considering the visual output on a bit-by-bit basis. As such, the software development test platform, method and computer program product of an example embodiment may be configured to determine that the visual output generated by execution of the computer software is acceptable in instances in which the visual perception to a viewer is the same as a reference image even though the data representative of the visual output that is generated by execution of the computer software varies somewhat, albeit in a visually imperceptible manner, from the reference image. Consequently, the software development test platform, method and computer program product of an example embodiment more closely mimics the review performed by a test engineer considering the visual impression created by the visual output, albeit in an automated fashion without manual intervention. Thus, the software development test platform, method and computer program product of an example embodiment may identify a smaller percentage of the visual output generated by execution of computer software to require further review by a testing engineer in order to determine its acceptability, thereby increasing the speed and efficiency and correspondingly reducing the costs associated with the evaluation of the visual output.

The software development test platform may be embodied by a variety of different computing devices. For example, the software development test platform may be embodied by one or more servers, personal computers, computer workstations, image processing systems or the like. Regardless of the type of computing device that embodies the software development test platform, the software development test platform of an example embodiment is depicted in FIG. 1 and includes or is otherwise associated with processing circuitry 12 including, for example, a processor 14 and memory 16, and optionally a user interface 20 for interacting with the processing circuitry.

In some embodiments of the processing circuitry 12, the processor 14 (and/or co-processors or any other circuitry assisting or otherwise associated with the processor) may be in communication with the memory device 16 via a bus for passing information among components of the software development test platform 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the software development test platform to carry out various functions in accordance with an example embodiment. For example, the memory device could be configured to buffer input data for processing by the processor. Additionally or alternatively, the memory device could be configured to store instructions for execution by the processor.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

In some embodiments, the software development test platform 10 may optionally include a user interface 20 that may, in turn, be in communication with the processing circuitry 12 to receive an indication of a user input and/or to cause presentation of the video output generated by execution of computer software. As such, the user interface may include, for example, a keyboard, a mouse, a joystick, a display, a touch screen(s), touch areas, soft keys, a microphone, a speaker, or other input/output mechanisms. Alternatively or additionally, the processor 14 may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device 16, and/or the like).

Referring now to FIG. 2, the operations performed by the software development test platform 10 of an example embodiment are depicted. As shown in block 30 of FIG. 2, the software development test platform of an example embodiment includes means, such as the processing circuitry 12, the processor 14 or the like, for providing data representative of a visual output generated in response to execution of computer software. In this regard, the computer software may be generated in various manners including via a software development kit (SDK) or some other development platform. The computer software may have been written in order to perform one or more functions with at least one of the functions of the computer software being the generation of a visual output in response to execution of the computer software.

The visual output generated in response to execution of the computer software may be any of various types of visual output, but, in one example embodiment, the visual output is map-centric rendered data, such as a rendered map and/or a calculated route. As shown in FIG. 3, for example, execution of the computer software may result in a map 40 that is presented upon a display 42 and that may optionally include a route 44 from an origin 46 to a destination 48, such as based upon user input. The map-centric rendered data may be intended for presentation by a variety of systems including mapping systems, location or positioning systems including a global positioning system (GPS), routing systems and the like including, for example, an advanced driver assistance system (ADAS) that may be employed by vehicles.

In relation to the provision of the data representative of the visual output generated in response to execution of the computer software, a visually perceptible display of the visual output need not be presented. Instead, data generated by the execution of the computer software is provided that may subsequently be rendered by a display device in order to create a visually perceptible image. Thus, execution of the computer software generates data that may be rendered to create a visual perceptible image with the data being received and processed by the software development test platform 10 in accordance with an example embodiment. In one embodiment, the data that may be rendered to create the visually perceptible image is stored, such as by the memory 16 or by another memory device accessible to the processing circuitry 12, such that the processing circuitry, the processor 14 or the like is configured to provide the data representative of the visual output by accessing the stored data.

As shown in block 32 of FIG. 2, the software development test platform 10 also includes means, such as the processing circuitry 12, the processor 14 or the like, for comparing the data representative of the visual output to a reference image utilizing perceptual hashing. Although various perceptual hashing techniques may be utilized, the perceptual hashing of the data representative of the visual output and the reference image is performed utilizing a pHash algorithm in accordance with an example embodiment. In this regard, the reference image is the image data that is anticipated to be generated by the execution of the computer software in an instance in which the computer software performs as desired. The reference image 18 may be stored by the memory 16 of the processing circuitry as shown in FIG. 1 or by another memory device in communication with the processing circuitry, such as via a communication interface of the software development testing platform.

In relation to the perceptual hashing, the data representative of the visual output is compared to the reference image by comparing a hash value of the data representative of the visual output and a hash value of the reference image to define a perceptual difference between the visual output and the reference image. In this regard, the processing circuitry 12, the processor 14 or the like are configured in accordance with an example embodiment to compare the data representative of the visual output to the reference image by creating the hash value of the data representative of the visual output by decolorization and separation of the image data into a collection of frequencies and scalers through computation of a discrete cosine transform. The hash value of the data representative of the visual output and the hash value of the reference image may then be compared by the processing circuitry, the processor or the like by determining a distance between the hash value of the data representative of the visual output and the hash value of the reference image to define the perceptual difference between the visual output and the reference image. Further details regarding perceptual hashing, such as employed by the software development test platform of an example embodiment are provided by Tang, et al., "Perceptual Hashing for Color Images Using Invariant Moments", Appl. Math. Inf. Sci. 6, No. 2S, pp. 643S-650S (2012) and Zauner, "Implementation and Benchmarking of Perceptual Hash Functions" (July 2010). By utilizing perceptual hashing in order to define the perceptual difference between the data representative to the visual output and the reference image, the software development test platform 10 and, more particularly the processing circuitry, the processor or the like are configured to compare the visual output to the reference image at a perceived information level, that is, based upon the visual perception of the visual output relative to reference image by a viewer of the visual output and not based upon a bit-wise comparison.

By evaluating the visual output generated by execution of computer software at a perceived information level, differences between the visual output generated in response to execution of the computer software and a reference image that are imperceptible or virtually imperceptible to a viewer are not identified to create a perceptual difference even though the differences may create bit-wise variations between the data representative of the visual output and the reference image. In this regard, the differences between the visual output generated in response to execution of the computer software and a reference image are considered to be perceptually indistinguishable notwithstanding the differences otherwise identified by a bit-wise comparison of the data representative of visual output and the reference image.

Referring now to decision block 34 of FIG. 2, the software development test platform 10 includes means, such as the processing circuitry 12, the processor 14 or the like, for determining whether the perceptual difference between the data representative of the visual output and the reference image satisfies a predefined threshold. In an instance in which the processing circuitry, the processor or the like determines that the perceptual difference satisfies the predefined threshold, such as in an instance in which the perceptual difference is less than the predefined threshold, the software development test platform includes means, such as the processing circuitry, the processor or the like, for determining that the visual output is acceptable as shown in block 36 of FIG. 2. Alternatively, in an instance in which the perceptual difference fails to satisfy the predefined threshold, the software development test platform includes means, such as the processing circuitry, the processor or the like, for identifying the visual output to be subjected for further review as shown in block 38.

The predefined threshold may be established such that relatively minor, visually imperceptible or nearly visually imperceptible differences between the visual output and the reference image create a perceptual difference that satisfies the predefined threshold, thereby permitting the visual output to be determined to be acceptable. For example, in the context in which the data representative of the visual output is map-centric rendered data, changes brought about by relatively minor modifications to the map, such as due to road conditions and/or traffic update between the reference image and the visual output that are imperceptible or virtually imperceptible to a viewer will create only a minor perceptual difference between the visual output and reference image such that the perceptual difference will be found to satisfy the predefined threshold and the visual output will be correspondingly found to be acceptable. Similarly, relatively small changes between the reference image and the visual output brought about by, for example, differences in the manner in which different display devices present the same image, differences attributable to approximations introduced during calculations performed by the computer software and/or differences brought about by shifting or translation of the image as shown at 50 in FIG. 3, rotation of the image as shown at 52 in FIG. 3, zooming or scaling of the image and/or subjecting the image to a color shift that are visually imperceptible or virtually visually imperceptible to a viewer may also create a relatively small, if any, perceptual difference between the visual output and the reference image such that the perceptual difference will satisfy the predefined threshold and the visual output will be found to be acceptable.

Thus, in these foregoing examples in which the visual output does differ from the reference image, such as in a manner that would create a relatively substantial difference if a bit-wise comparison of the visual output and the reference image were performed, but that creates a small visually perceptual difference, if any, between the visual output and the reference image, the perceptual difference will be determined to be relatively small and to satisfy the predefined threshold such that the visual output will be correspondingly determined to be acceptable. As the visual output is found to be acceptable, the visual output generated in response to execution of computer software need not be subjected to a manual review, such as by a test engineer. As such, the evaluation of the computer software may be performed in a more efficient, cost effective and timely manner. However, in an instance in which there is a visually perceptual difference between the visual output and the reference image, the perceptual difference may be such that the predefined threshold is not satisfied, such as in an instance in which the perceptual difference exceeds the predefined threshold. In this instance, the visual output is identified to need further manual review prior to qualification of the computer software. Thus, the software development test platform 10, method and computer program product of any example embodiment still identifies the visual output generated in response to execution of the computer software that is visually perceptually different than a reference image in order to facilitate additional review of the perceptually different visual output, but does so only after eliminating the visual output that differs only in a visually imperceptible amount from the reference image from consideration for review such that the percentage of times that the visual output must be subjected to manual review is reduced.

As described above, FIG. 2 illustrates a flowchart of a software development test platform 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of a software development test platform employing an embodiment of the present invention and executed by the processing circuitry 12, the processor 14 or the like of the software development test platform. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A software development test platform comprising at least one processor and at least one memory including computer program code, the at least one memory and computer program code configured to, with the processor, cause the software development test platform to at least:
provide data representative of visual output generated in response to execution of computer software, wherein the data representative of the visual output comprises image data;
create a hash value of the data representative of the visual output by decolorization and separation of the image data into a collection of frequencies and scalars through computation of a discrete cosine transform;
compare the data representative of the visual output to a reference image utilizing perceptual hashing, wherein the data representative of the visual output is compared to the reference image by comparing the hash value of the data representative of the visual output and a hash value of the reference image to define a perceptual difference between the visual output and the reference image; and
determine the visual output to be acceptable in an instance in which the perceptual difference satisfies a predefined threshold.

2. A software development test platform according to claim 1 wherein the at least one memory and computer program code are configured to, with the processor, cause the software development test platform to compare the data representative of the visual output to the reference image by comparing the data representative of the visual output to the reference image at a perceived information level.

3. A software development test platform according to claim 1 wherein the at least one memory and computer program code are configured to, with the processor, cause the software development test platform to compare the hash value of the data representative of the visual output and the hash value of the reference image by determining a distance between the hash value of the data representative of the visual output and the hash value of the reference image to define the perceptual difference between the visual output and the reference image.

4. A software development test platform according to claim 1 wherein the at least one memory and computer program code are configured to, with the processor, cause the software development test platform to provide the data representative of the visual output by providing map-centric rendered data.

5. A software development test platform according to claim 4 wherein the map-centric rendered data comprises one or more of a rendered map or a calculated route.

6. A software development test platform according to claim 1 wherein the at least one memory and computer program code are further configured to, with the processor, cause the software development test platform to identify the visual output to be subjected to further review in an instance in which the perceptual difference fails to satisfy the predefined threshold.

7. A method for evaluating visual output generated by execution of computer software, the method comprising:
   providing data representative of the visual output generated in response to execution of the computer software, wherein the data representative of the visual output comprises image data;
   creating a hash value of the data representative of the visual output by decolorization and separation of the image data into a collection of frequencies and scalars through computation of a discrete cosine transform;
   comparing the data representative of the visual output to a reference image utilizing perceptual hashing, wherein comparing the data representative of the visual output to the reference image comprises comparing the hash value of the data representative of the visual output and a hash value of the reference image to define a perceptual difference between the visual output and the reference image; and
   determining the visual output to be acceptable in an instance in which the perceptual difference satisfies a predefined threshold.

8. A method according to claim 7 wherein comparing the data representative of the visual output to the reference image further comprises comparing the data representative of the visual output to the reference image at a perceived information level.

9. A method according to claim 7 wherein comparing the hash value of the data representative of the visual output and the hash value of the reference image comprises determining a distance between the hash value of the data representative of the visual output and the hash value of the reference image to define the perceptual difference between the visual output and the reference image.

10. A method according to claim 7 wherein providing the visual output comprises providing map-centric rendered data.

11. A method according to claim 10 wherein the map-centric rendered data comprises one or more of a rendered map or a calculated route.

12. A method according to claim 7 further comprising identifying the visual output to be subjected to further review in an instance in which the perceptual difference fails to satisfy the predefined threshold.

13. A computer program product comprising at least one non-transitory computer-readable storage medium having computer-executable program code portions stored therein, the computer-executable program code portions comprising program code instructions configured to:
   provide data representative of visual output generated in response to execution of computer software, wherein the data representative of the visual output comprises image data;
   create a hash value of the data representative of the visual output by decolorization and separation of the image data into a collection of frequencies and scalars through computation of a discrete cosine transform;
   compare the data representative of the visual output to a reference image utilizing perceptual hashing, wherein the program code instructions configured to compare the data representative of the visual output to the reference image comprise program code instructions configured to compare a hash value of the data representative of the visual output and a hash value of the reference image to define a perceptual difference between the visual output and the reference image; and
   determine the visual output to be acceptable in an instance in which the perceptual difference satisfies a predefined threshold.

14. A computer program product according to claim 13 wherein the program code instructions configured to compare the data representative of the visual output to the reference image further comprise program code instructions configured to compare the data representative of the visual output to the reference image at a perceived information level.

15. A computer program product according to claim 13 wherein the program code instructions configured to compare the hash value of the data representative of the visual output and the hash value of the reference image comprise program code instructions configured to determine a distance between the hash value of the data representative of the visual output and the hash value of the reference image to define the perceptual difference between the visual output and the reference image.

16. A computer program product according to claim 13 wherein the program code instructions configured to provide the visual output comprise program code instructions configured to provide map-centric rendered data.

17. A computer program product according to claim 13 wherein the computer-executable program code portions further comprise program code instructions configured to identify the visual output to be subjected to further review in an instance in which the perceptual difference fails to satisfy the predefined threshold.

* * * * *